(12) United States Patent
Carlstedt et al.

(10) Patent No.: US 6,722,677 B2
(45) Date of Patent: Apr. 20, 2004

(54) CONNECTING COMPONENT

(75) Inventors: Robert P. Carlstedt, Rochester Hills, MI (US); Daniel Eugene Whitney, Arlington, MA (US); Mark C. Smith, Troy, MI (US); Eric Stephen Geib, Fenton, MI (US); Steven M. Foster, Rochester, MI (US); Richard M. Clisch, Canton, MI (US); Shan Shih, Troy, MI (US); Juan Jose Marcos Munoz, Pamplona (ES)

(73) Assignee: Meritor Light Vehicle Technology, LLC, Troy, MI (US)

( * ) Notice: Subject to any disclaimer, the term of this patent is extended or adjusted under 35 U.S.C. 154(b) by 111 days.

(21) Appl. No.: 10/037,279

(22) Filed: Jan. 4, 2002

(65) Prior Publication Data

US 2003/0127820 A1 Jul. 10, 2003

(51) Int. Cl.⁷ ............................................... B60G 11/23
(52) U.S. Cl. ........................ 280/124.169; 280/124.177; 267/140.11
(58) Field of Search ................... 280/124.166, 124.169, 280/124.177, 124.157, 788; 267/136, 140.11, 140.13, 140.14, 140.15, 35; 248/562

(56) References Cited

U.S. PATENT DOCUMENTS

| 602,462 A | 4/1898 | Mendel |
|---|---|---|
| 2,138,175 A | 11/1938 | Keys |
| 2,216,814 A | 10/1940 | Gray, Jr. et al. |
| 3,462,136 A | * 8/1969 | Rumsey ..................... 267/136 |
| 3,612,506 A | * 10/1971 | Malherbe ..................... 267/152 |
| 4,195,713 A | 4/1980 | Hagbjer et al. |
| 4,278,726 A | 7/1981 | Wieme |
| 4,627,635 A | 12/1986 | Koleda |
| 4,750,720 A | 6/1988 | Wolf et al. |
| 4,776,573 A | 10/1988 | Wolf et al. |
| 4,822,245 A | 4/1989 | Aubry et al. |
| 4,914,799 A | 4/1990 | Kyle |
| 4,964,516 A | 10/1990 | Thorn |
| 5,000,428 A | 3/1991 | Thorn |
| RE33,696 E | * 9/1991 | Stevenson ..................... 267/33 |
| 5,054,753 A | 10/1991 | Polus |
| 5,088,702 A | 2/1992 | Thelamon et al. |
| 5,160,121 A | * 11/1992 | Bartholomew ............... 267/136 |
| 5,232,073 A | 8/1993 | Bronowicki et al. |
| 5,373,920 A | 12/1994 | Valdivia et al. |
| 5,418,073 A | 5/1995 | Loth et al. |
| 5,435,531 A | 7/1995 | Smith et al. |
| 5,556,083 A | * 9/1996 | Furihata et al. .............. 267/277 |
| 5,687,948 A | 11/1997 | Whiteford et al. |
| 6,092,795 A | 7/2000 | McGuire |
| 6,158,772 A | 12/2000 | Skudutis |

FOREIGN PATENT DOCUMENTS

| DE | 19715714 | 10/1998 |
|---|---|---|
| DE | 10127583 | 12/2002 |

OTHER PUBLICATIONS

European Search Report Dated Sep. 24, 2003.

* cited by examiner

*Primary Examiner*—David R. Dunn
(74) *Attorney, Agent, or Firm*—Carlson, Gaskey & Olds (57) ABSTRACT

A connecting component connecting two members, such as a suspension component and a vehicle component, dampens vibrations and produces springing forces. The connecting component is formed by a steel strip including a plurality of holes. A sealing strip is secured to the upper surface of the steel strip to contain fluid for damping, and springing strips are secured to the upper surface of the steel strip to provide for springing forces. The steel strip is rolled to form the connecting component, trapping the fluid between the sealing strips. As the connecting component is a linking element with several degrees of freedom, different springing and damping rates are possible at each degree of freedom.

21 Claims, 8 Drawing Sheets

CONNECTING COMPONENT

BACKGROUND OF THE INVENTION

The present invention relates generally to a method for building a connecting component which produces variable damping and springing forces.

A suspension system absorbs road shock and other vibrations, while providing for a smooth and comfortable ride. The suspension system responds to wheel disturbances and reacts to maintain wheel contact with the road surface.

Damping systems are commonly employed in vehicles to produce opposing forces which counteract vibrations produced during vehicle operation. Suspension systems provide damping and springing forces to cancel resonant responses that cause unwanted motion. In prior suspension systems, fluid filled shock absorbers counteract these vibrations. As fluid is commonly utilized to provide damping, the damping force increases approximately proportionally with the viscosity of the damping fluid. A drawback to prior damping systems is that these shock absorbers are passive in nature.

A connecting component, such as a bushing, is commonly utilized in a vehicle suspension system to connect a suspension component, such as a stabilizer bar, to a vehicle component. One drawback to prior art connecting component is the inability of the connecting component to vary the damping and springing forces, especially at different locations of the connecting component.

Hence, there is a need in the art for an improved connecting component which produces variable damping and springing forces.

SUMMARY OF THE INVENTION

This invention relates to a method for building a connecting component which produces variable damping and springing forces.

The connecting component of the present invention is formed by a steel strip including a plurality of holes. A continuous sealing strip positioned on the upper surface of the steel strip inside the perimeter contains a fluid which provides damping, and springing strips positioned inside the sealing strip provide springing forces. As the steel strip is rolled to form the connecting component, fluid dispersed on the upper surface of the steel strip by a fluid disperser is contained and substantially trapped within the sealing strip. When the rolling is complete, a connecting component is formed with a substantially spirally shaped interior structure.

The connecting component connects and transmits force between two members, preferably a stabilizer bar of a suspension system and a vehicle component. Relative movement or springing is provided by the elastic springing strips, while vibration attenuation or damping is provided by the fluid passing through the holes. The connecting component is a linking element with several degrees of freedom, and different springing and damping rates are possible at each degree of freedom due to this invention. The characteristics of the connecting component can be altered by changing the distribution of the elastic springing strips and the holes.

When a force acts on the connecting component, the elastic springing strips under the force are compressed, expanding surrounding springing strips and allowing for springing. Fluid is forced through the holes from the area being compressed to the area being expanded, producing a damping effect. The connecting component allows for rotation and displacement while at the same time providing for springing and damping of vibrations.

In one embodiment, the fluid may be electro-rheological fluid or magnetic-rheological fluid. Piezo-elements located on a load carrying member, such as a spring, energize and alter the state of the fluid in the connecting component, allowing for further control of the relative stiffness of the connecting component.

Accordingly, the present invention provides a method for building connecting components which produces variable damping and springing forces.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
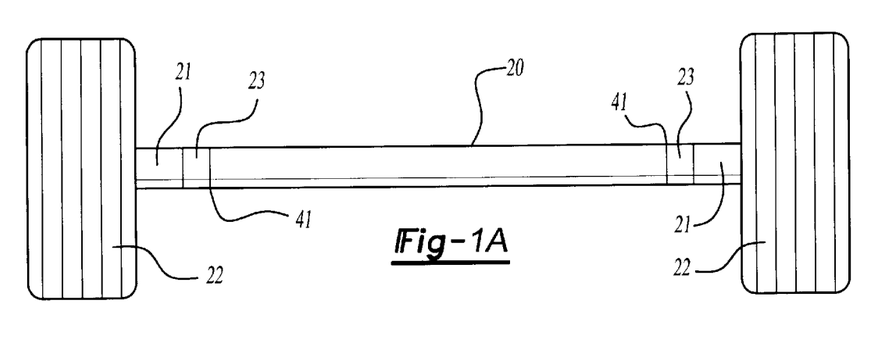
FIG. 1A illustrates the connecting component utilized to connect a suspension component to a vehicle component.

FIG. 1A illustrates the connecting component 23 of the present invention employed to connect a suspension component 20 to a vehicle component 21 positioned between and moving with wheels 22. Here the suspension component 20 may be a stabilizer bar and vehicle component 21 may be part of the wheel assembly. The connecting component 23 transmits forces and movement between the suspension component 20 and the vehicle component 21, while allowing for relative movement through springing and vibration attenuation through damping. The connecting component 23 is inserted into the end 41 of the suspension component 20 and into the vehicle component 21, connecting the suspension component 20 to the vehicle component 21.

Figure 1B:
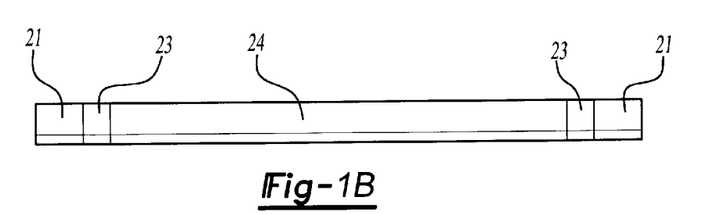
FIG. 1B schematically illustrates the connecting component utilized to connect a member to a vehicle component.

As illustrated schematically in FIG. 1B, the connecting component 23 can also be used as a bushing to connect a member 24, such as a torsion bar, a frame rail or seat metal, to a vehicle component 21, here a frame part.

Figure 1C:
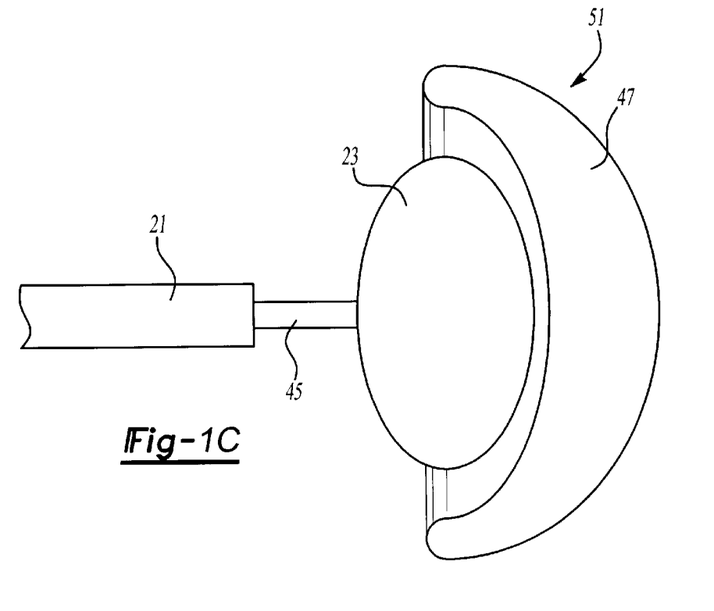
FIG. 1C schematically illustrates the connecting component utilized on a bumper.

As illustrated schematically in FIG. 1C, a larger connecting component 23 can also be used in a bumper 51 to absorb impact. The connecting component 23 is attached to the vehicle component 21 and is positioned within the body panel 47. Alternatively, a support member 45 can attach the connecting component 23 to the vehicle component 21.

The following figures will illustrate how the invention connecting component 23 may be preferably manufactured.

Figure 2:
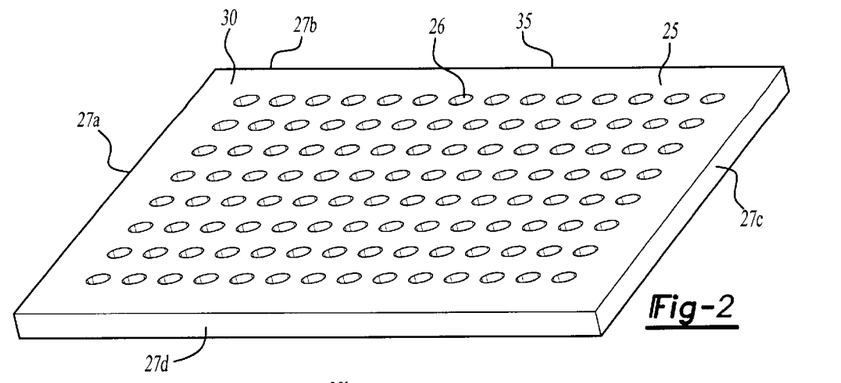
FIG. 2 illustrates a perspective view of the steel sheet perforated with a plurality of holes.

As illustrated in FIG. 2, a steel strip 25 having a defined thickness is cut to a desired dimension. A plurality of holes 26 are perforated on the steel strip 25 at defined sites and at a defined distribution. It is preferred that the steel strip 25 be substantially rectangular and include four edges 27a, 27b, 27c, and 27d. The steel strip 25 can also be coated for corrosions resistance.

Figure 3:
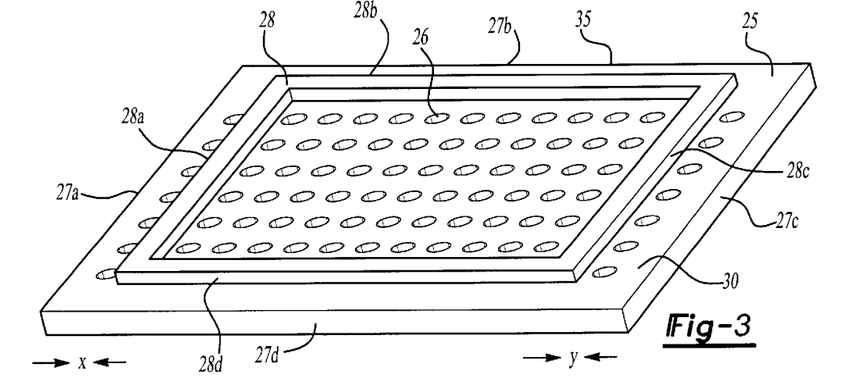
FIG. 3 illustrates a perspective view of the steel sheet with the sealing strips.

As shown in FIG. 3, a continuous sealing strip 28 is positioned on the upper surface 30 of the steel strip 25 substantially inside the perimeter 35. The sealing strip 28 is preferably made of rubber and is secured to the steel strip 25 by gluing or bonding. Once positioned, the sealing strip 28 includes four sides 28a, 28b, 28c, 28d, each corresponding to one of the edges 27a, 27b, 27c, 27d, respectively, of the steel strip 25. Sides 28a and 28c of the sealing strip 28 are positioned at a length X and Y, respectively, away from edges 27a and 27c of the steel strip 25.

Figure 4A:
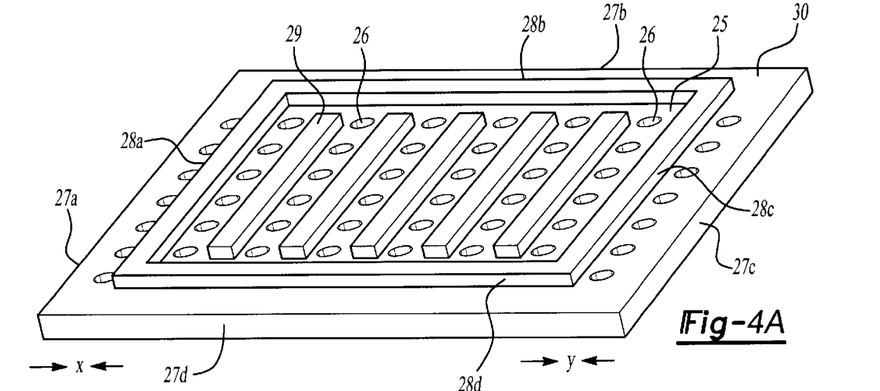
FIG. 4A illustrates a perspective view of the steel sheet with the springing strips in a first orientation.
Figure 4B:
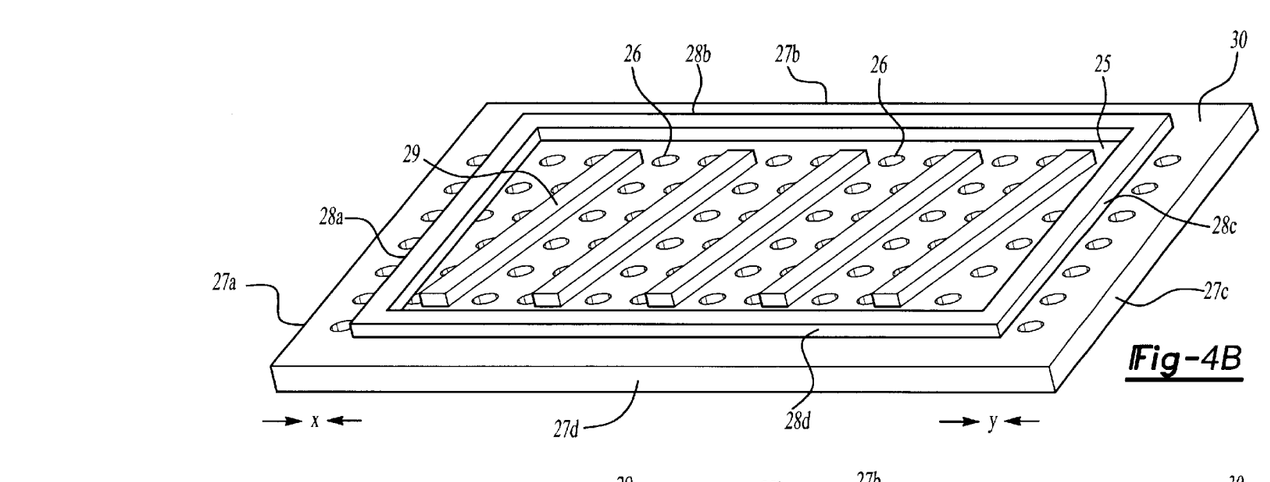
FIG. 4B illustrates a perspective view of the steel sheet with the springing strips in a second orientation.
Figure 4C:
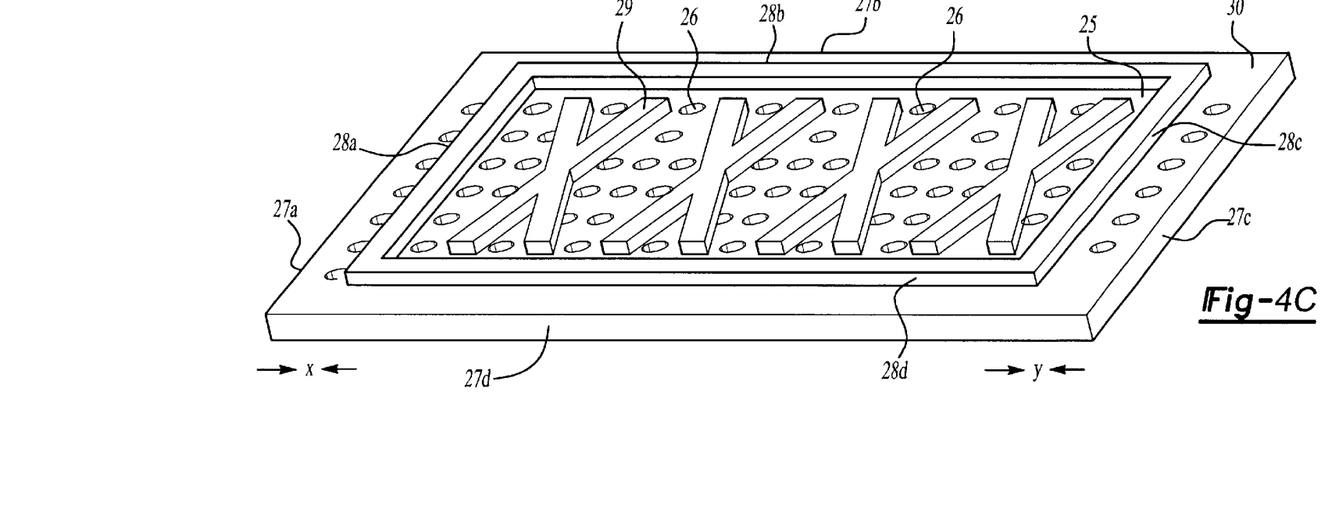
FIG. 4C illustrates a perspective view of the steel sheet with the springing strips in a third orientation.
Figure 4D:
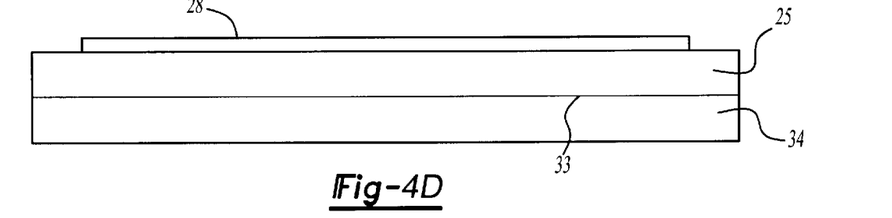
FIG. 4D illustrates an additional layer of springing material employed on the steel strip.

As shown in FIGS. 4A, 4B and 4C, springing strips 29, preferably made of rubber, are positioned at a defined distribution, orientation and site on the upper surface 30 of the steel strip 25 inside the continuous sealing strip 28. It is preferred that the springing strips 29 be positioned substantially parallel or angled to the edges 27a and 27c of the steel strip 25, as illustrated in FIGS. 4A and 4B, respectively, or be substantially X-shaped, as illustrated in FIG. 4C. It is to be understood that other orientations, shapes and positions of the springing strips 29 are possible. As illustrated in FIG. 4D, an additional layer of springing material 34 can be secured to the lower surface 33 of the steel sheet 25 to provide providing for additional springing.

Figure 5:
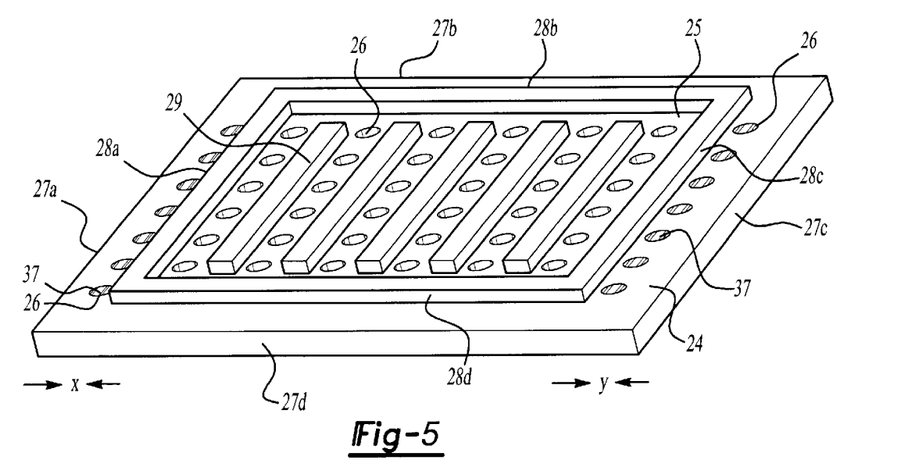
FIG. 5 illustrates a perspective view of the steel sheet with the plurality of holes along length X and Y bonded with a sealing material.

As shown in FIG. 5, holes 26 positioned on lengths X and Y, substantially outside of the sealing strips 28a and 28c, may be sealed with a sealing material 37, preferably rubber. Alternatively, the steel strip 25 can be fabricated without holes 26 on the lengths X and Y.

Figure 6:
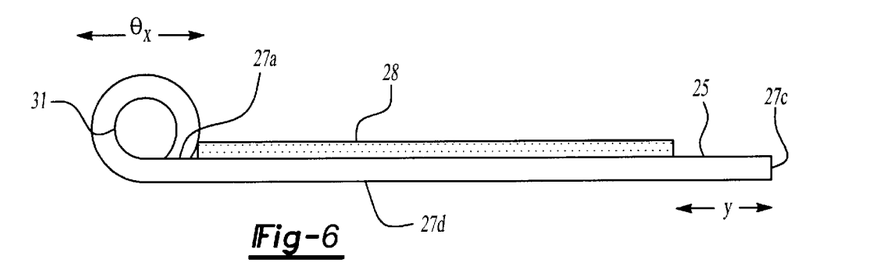
FIG. 6 illustrates a side view of the steel sheet at the first stage of rolling.
Figure 7A:
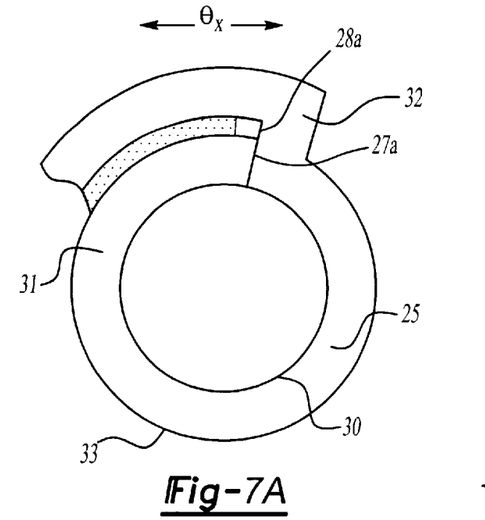
FIG. 7A illustrates an enlarged view of the loop showing a first type of attachment of an edge of length X to the steel sheet.
Figure 7B:
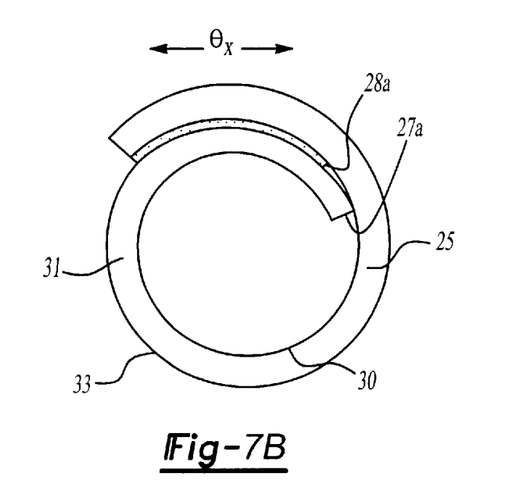
FIG. 7B illustrates an enlarged view of a loop showing a second type of attachment of and edge of length X to the steel sheet.
Figure 7C:
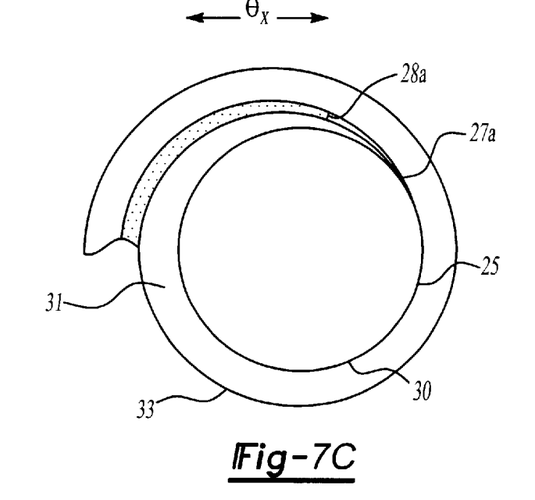
FIG. 7C illustrates an enlarged view of a loop showing a third type of attachment of an edge of length X to the steel sheet.

As shown in FIG. 6, the length X of the steel strip 25 is next rolled to create a loop 31 having a first diameter $\phi_X$. After rolling, it is preferred that the edge 27a of length X be prebonded to the steel strip 25. The edge 27a can be secured to the steel strip 25 in several manners. As illustrated in FIG. 7A, a bend 32 could be formed on the steel strip 25 proximate to the sealing strip 28a, and the edge 27a bonded directly to the bend 32. As illustrated in FIG. 7B, the edge 27a of length X is rolled and secured such that the lower surface 33 of the steel strip 25 is bonded directly to the upper surface 30 of the steel strip 25. As illustrated in FIG. 7C, the length X can be substantially tapered at edge 27a, rather than being a uniform thickness as illustrated in FIG. 7B.

Figure 8:
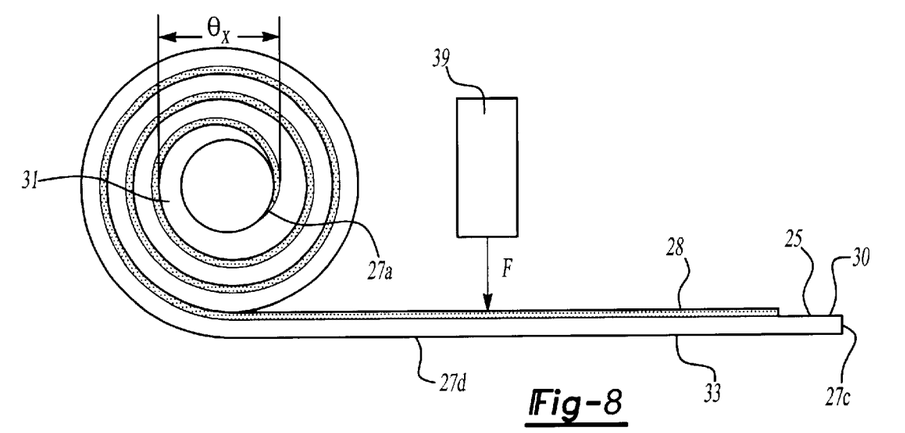
FIG. 8 illustrates a side view of the connection component during rolling.

As illustrated in FIG. 8, the steel strip 25 is then rolled around first diameter $\phi_X$, and a viscous fluid F is dispersed from a fluid dispenser 39 on to the upper surface 30 of the steel strip 25. This fluid F is substantially trapped on the upper surface 30 between the sealing strips 28 during rolling.

Figure 9:
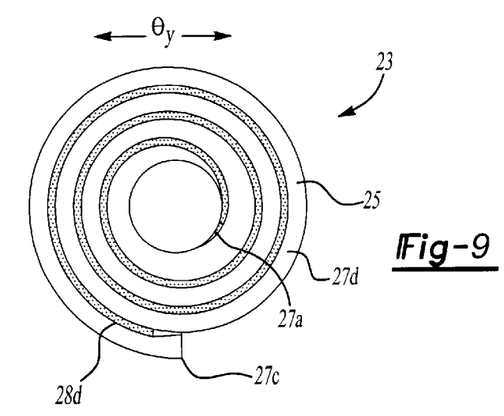
FIG. 9 illustrates a side view of the connecting component after rolling.

As shown in FIG. 9, when rolling is completed, the steel strip 25 is completely rolled around the first diameter $\phi_X$ to create the substantially spirally shaped connecting component 23. During rolling, the sealing strips 28 and the springing strips 29 are compressed a desired degree, but are not fully compressed to allow for further compression when necessary. During rolling it is desired that the diameter $\phi_X$ be maintained without deformation. Rolling is completed by rolling length Y over the connecting component 23 and securing edge 27c to the lower surface 33 of the steel strip 25 to prevent opening, forming the connecting component 23 of diameter $\phi_Y$. Edge 27c is preferably secured by welding or gluing, although other methods of attachment are possible.

The connecting component 23 transmits force between the suspension component 20 and the vehicle component 21, allowing for relative movement and vibration attenuation. The springing properties of the connecting component 23 are produced by the compression of the springing strips 29, while damping is produced by the fluid F being forced to pass through the holes 26. As the connecting component 23 is a linking elements with several degrees of freedom, different springing and damping rates are possible at each degree of freedom. The characteristics of the connecting component 23 can be altered by changing the distribution of the elastic springing strips 29 and the holes 26.

Figure 10:
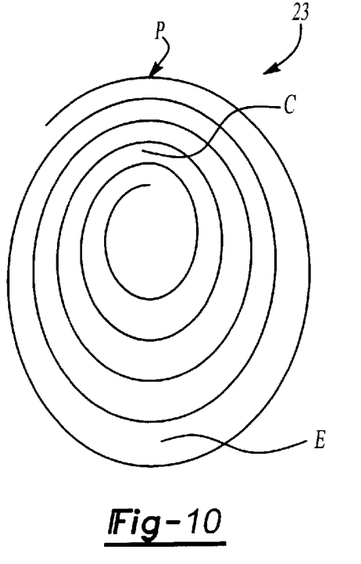
FIG. 10 illustrates the connecting component being compressed.

As shown in FIG. 10, when a force P acts on connecting component 23, the springing strips 29 proximate to force P are compressed. The fluid F is forced through the holes 26 from the area being compressed C towards the area being expanded E, producing damping. Additionally, as the elastic strips 29 are more compressible than the fluid F, the compression allows more room for the incoming fluid F. As the displacement of the fluid F may produce a small fluid F flow, additional small holes may be necessary in the steel strip 25 to produce the fluid pressure drop necessary for damping. If smaller holes are required, an additional process step of laser beam drilling can create the holes. However, if less damping is required, the holes 26 in the steel strip 25 and the fluid F can be eliminated, the springing strips 29 providing the necessary damping.

Figure 11A:
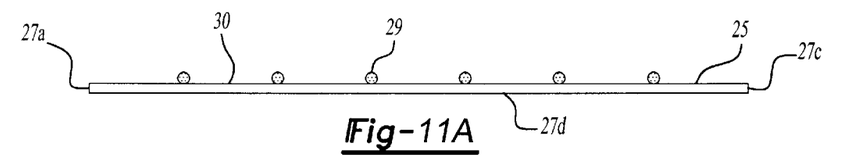
FIG. 11A illustrates a side view of the springing strips on the steel strip in a first orientation.
Figure 11B:
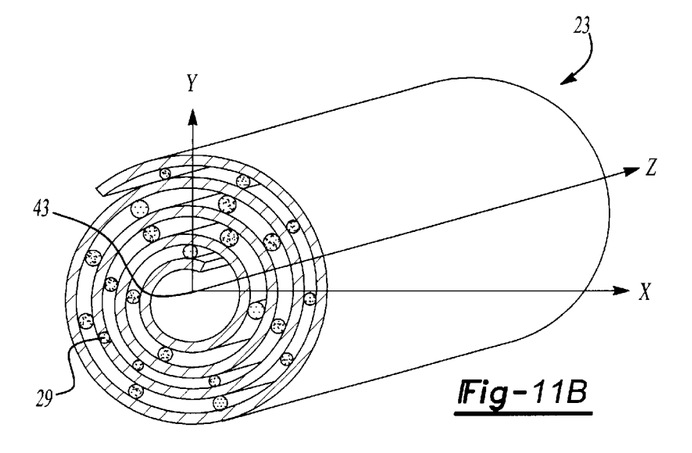
FIG. 11B illustrates a cross sectional view of the connecting component formed by the steel strip of FIG. 11A.

In one embodiment, the connecting component 23 is utilized as a bushing. The springing strips 29 and the holes 26 can be distributed so different axes have different springing and damping characteristics. In one embodiment, as shown in FIG. 11A, the springing strips 29 are spaced substantially equally apart on the upper surface 30 of the steel strip 25. When the steel strips 25 is rolled to form the connecting component 23, as illustrated in FIG. 11B, the springing strips 29 are randomly positioned about an axis Z extending substantially along the length of the center of the connecting component 23.

Figures 12A, 12B:
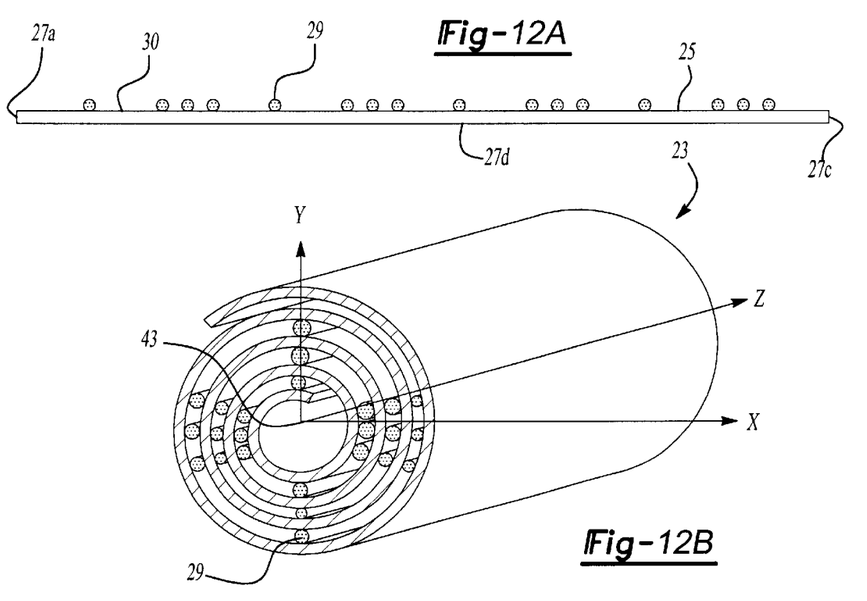
FIG. 12A illustrates a side view of the springing strips on the steel strip in a second orientation.
FIG. 12B illustrates a cross sectional view of the connecting component formed by the steel strip of FIG. 12A.

In another embodiment, as illustrated in FIG. 12A, the springing strips 29 are positioned in a pattern farther part on the upper surface 30 of the steel strip 25 in a repeating pattern. When the steel strip 25 is rolled to form the connecting component 23 illustrated in FIG. 12B, the springing strips 29 are positioned such that more springing strips 29 are positioned along the X-axis, allowing for stiffer springing along axis X, and fewer springing strips 29 are positioned along the Y-axis, allowing for softer springing on axis Y. A worker in this art could easily determine how to arrange the strips 29 to get the final desired configuration.

The holes 26 can also be positioned and numbered to correspond to a desired degree of damping. In areas with less holes 26, there is greater damping, while in areas with more holes 26, there is less damping.

Variations in characteristics on the Z-axis are created by utilizing springing strips 29 of varying shape, such as the substantially X-shaped strips illustrated in FIG. 4C.

Figure 13:
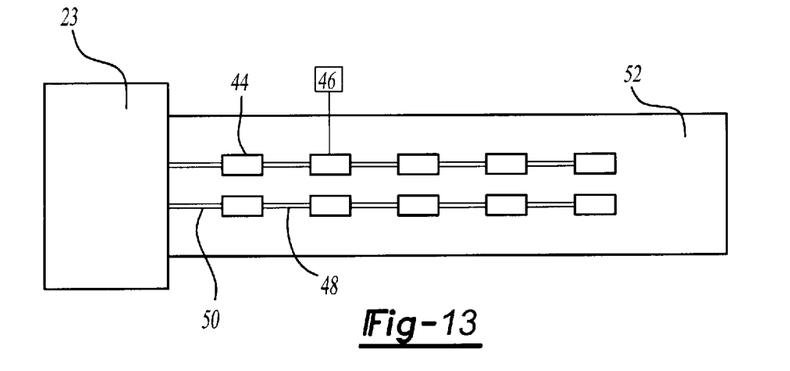
FIG. 13 illustrates a top view of active electrical elements utilized on a load carrying member to supply voltage to the fluid of the connecting component.

Further damping can occur by using electro-rheological or magnetic-rheological fluid F, as illustrated in FIG. 13. When in the liquid state, the electro-rheological or magnetic-rheological fluid F is flexible and soft. Electrical elements 44, such as capacitors or coils, are located on a load carrying member 52 and connected by a plurality of lead wires 48. A control voltage generated by a power source 46 is applied to the electrical elements 44 to generate an electric field or a magnetic field, supplying voltage to the connecting component 23 by a connecting wire 50. The power source 46 is either inside the system or outside the system, such as a battery. The control voltage increase the viscosity of the fluid F, increasing the relative stiffness of the connecting component 23.

Figure 14:
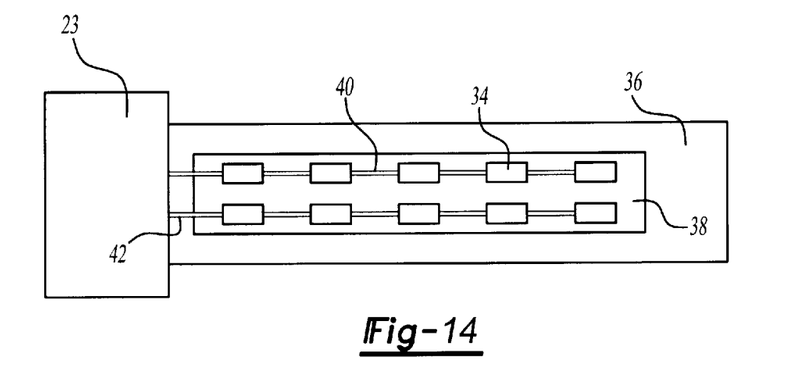
FIG. 14 illustrates a top view of piezo-elements utilized on a load carrying member to supply voltage to the fluid of the connecting component.
Figure 15:
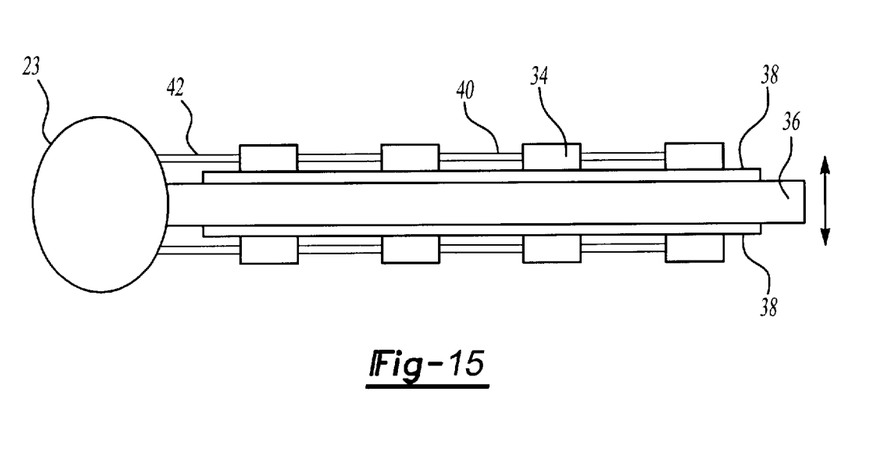
FIG. 15 illustrates a side view of the piezo-elements of FIG. 14.

Alternatively, as shown in FIGS. 14 and 15, energy converters 34 are used to transfer the mechanical energy into electrical energy to control the viscosity of the electro-rheological or magnetic-rheological fluid F. When in the liquid state, the electro-rheological or magnetic-rheological fluid F is flexible and soft. The converters 34 can be a plurality of piezo-elements 34 mounted to a charge strip 38 on a load carrying member 36, such as a leaf spring, to derive the electrical input which increases the viscosity of the fluid F and the stiffness of the connecting component 23. The piezo-elements 34 are connected by a plurality of lead wires 40. Preferably, the piezo-elements 34 be bonded or glued to the charge strip 38. An increase in load deflects and energizes the piezo-elements 34 to produce an electrical input, supplying voltage to the connecting component 23 by a connecting wire 42, as illustrated in FIG. 14. The electrical input increases the viscosity of the fluid F, increasing the relative stiffness of the connecting component 23 and producing damping by the opposing forces created in the connecting component 23. The voltage signal is related to the displacement of the suspension and the piezo-element 34 deflection and provides voltage at desired locations of the connecting component 23. The piezo-elements 34 can provide constant voltage to selected portions of the connecting component 23, allowing for control over the feel of the ride.

There are several advantages to utilizing the connecting component 23 of the present invention. For one, damping and springing can be controlled at different degrees of freedom. Additionally, the connecting component 23 allows car passengers to experience less vibrations and shaking. For vehicle manufactures, there is more freedom in design, allowing for lower manufacturing costs. Finally, by using electrical elements 44 or piezo-elements 34, there is a higher resistance for damping, allowing for more compensation for larger displacements within the connecting component 23. A smaller disturbance can be reacted to with minimal force. If the connecting component 23 is used in a suspension system, the component 23 can limit body roll.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A vehicle suspension system comprising:
   a suspension component;
   a vehicle component; and
   a connecting component to attach said suspension component to said vehicle component, said connecting component including a sheet having a plurality of holes, a fluid applied to an upper surface of said sheet, a sealing member secured to said upper surface of said sheet to substantially contain said fluid, and at least one springing member secured to said sheet substantially within said sealing member, and said sheet is substantially rolled into a substantially spiral shape.

2. The vehicle suspension system as recited in claim 1 wherein said sheet is made of steel.

3. The vehicle suspension system as recited in claim 1 wherein said sealing member and said at least one springing member are made of an elastic material.

4. The vehicle suspension system as recited in claim 3 wherein said sealing member and said at least one springing member are made of rubber.

5. The vehicle suspension system as recited in claim 1 wherein said sealing member is positioned substantially inside a perimeter of said sheet.

6. The vehicle suspension system as recited in claim 1 wherein said at least one springing member is substantially linear.

7. The vehicle suspension system as recited in claim 6 wherein said at least one springing member is substantially parallel to an edge of said sheet.

8. The vehicle suspension system as recited in claim 6 wherein said at least one springing member is substantially angled from an edge of said sheet.

9. The vehicle suspension system as recited in claim 1 wherein said at least one springing member is substantially X-shaped.

10. The vehicle suspension system as recited in claim 1 wherein said at least one springing member comprises a plurality of springing members, wherein said plurality of springing members are positioned in a substantially equally spaced relationship on said upper surface of said steel strip.

11. The vehicle suspension system as recited in claim 1 wherein said at least one springing member comprises a plurality of springing members, wherein said plurality of said at least one springing members are positioned in a substantially unequally spaced relationship on said upper surface of said steel strip.

12. The vehicle suspension system as recited in claim 11 wherein each of said plurality of said at least one springing member is positioned repetitively progressively farther apart on said upper surface of said steel strip.

13. The vehicle suspension system as recited in claim 11 wherein said vehicle suspension system further includes a load carrying member including a plurality of piezo-elements, and said plurality of piezo-elements electrically connected to said connecting component to provide an electrical input to said connecting component under a load applied to said load carrying member.

14. The vehicle suspension system as recited in claim 13 wherein said applied electrical input substantially changes a state of said fluid.

15. The vehicle suspension system as recited in claim 13 wherein said load carrying member is a leaf spring.

16. The vehicle suspension system as recited in claim 13 wherein said fluid is electro-rheological.

17. The vehicle suspension system as recited in claim 13 wherein said fluid is magnetic-rheological.

18. The vehicle suspension system as recited in claim 11 wherein said vehicle suspension system further includes a load carrying member including a plurality of electrical elements, and said plurality of electrical elements are electrically connected to said connecting component to provide an electrical input to said connecting component under a load applied to said load carrying member, said plurality of electrical elements are powered by a power source and said electrical input substantially changes a state of said fluid.

19. The vehicle suspension system as recited in claim 1 wherein said suspension component is a stabilizer bar and said vehicle component is positioned substantially between a pair of wheels.

20. The vehicle suspension system as recited in claim 1 wherein said suspension component is a torsion bar.

21. The vehicle suspension system as recited in claim 1 wherein said suspension component is a bumper panel and said connecting component attaches said bumper panel to said vehicle component.

* * * * *

UNITED STATES PATENT AND TRADEMARK OFFICE
CERTIFICATE OF CORRECTION

PATENT NO. : 6,722,677 B2
DATED : April 20, 2004
INVENTOR(S) : Carlstedt et al.

It is certified that error appears in the above-identified patent and that said Letters Patent is hereby corrected as shown below:

<u>Column 7,</u>
Line 9, delete "said" before "at".
Line 19, insert -- are -- after "piezo-elements" and before "electrically".

Signed and Sealed this

Fifteenth Day of June, 2004

JON W. DUDAS
*Acting Director of the United States Patent and Trademark Office*